(12) United States Patent
Fetter

(10) Patent No.: US 9,564,839 B2
(45) Date of Patent: Feb. 7, 2017

(54) DRIVE DEVICE FOR A VEHICLE

(71) Applicant: SIEMENS AKTIENGESELLSCHAFT, Munich (DE)

(72) Inventor: Wolfgang Fetter, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/651,322

(22) PCT Filed: Nov. 25, 2013

(86) PCT No.: PCT/EP2013/074571
§ 371 (c)(1),
(2) Date: Jun. 11, 2015

(87) PCT Pub. No.: WO2014/090556
PCT Pub. Date: Jun. 19, 2014

(65) Prior Publication Data
US 2015/0318802 A1    Nov. 5, 2015

(30) Foreign Application Priority Data

Dec. 11, 2012 (DE) .................. 10 2012 222 691

(51) Int. Cl.
*H02P 1/54* (2006.01)
*H02P 5/74* (2006.01)
(Continued)

(52) U.S. Cl.
CPC ................. *H02P 5/74* (2013.01); *B60L 3/003* (2013.01); *B60L 3/0092* (2013.01); *B60L 3/04* (2013.01);
(Continued)

(58) Field of Classification Search
CPC ... B60L 15/32; B60L 2200/26; B60L 2220/14; B60L 2220/42; B60L 3/04; H02P 5/74
See application file for complete search history.

(56) References Cited

U.S. PATENT DOCUMENTS 5,670,851 A    9/1997  Numazaki
6,278,256 B1   8/2001  Aoyama
(Continued)

FOREIGN PATENT DOCUMENTS

CN    101100173 A    1/2008
EP     0718143 A1    6/1996
(Continued)

*Primary Examiner* — Karen Masih
(74) *Attorney, Agent, or Firm* — Laurence Greenberg; Werner Stemer; Ralph Locher

(57) ABSTRACT

A drive device for a vehicle, in particular a rail vehicle, includes a set of drive units each having at least one electric traction motor and a power generation unit which is provided for generating power for the traction motor, and a set of motor contactor units each being assigned to a traction motor. In order to provide a type of drive device which has a high availability in the event of a failure, has few structural elements and can be produced economically, at least one motor contactor unit includes at least one switching device which is connected between the power generation unit for the associated traction motor and a feed point.

10 Claims, 4 Drawing Sheets

Figure 1:
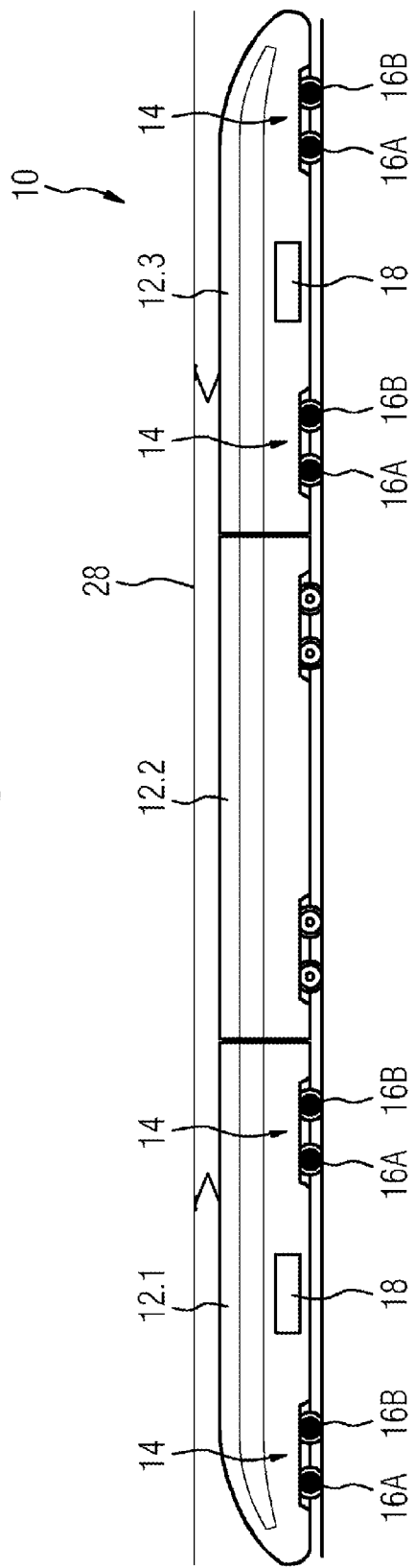

(51) Int. Cl.
*B60L 15/32* (2006.01)
*B60L 3/00* (2006.01)
*B60L 3/04* (2006.01)
*B60L 9/22* (2006.01)

(52) U.S. Cl.
CPC ................. *B60L 9/22* (2013.01); *B60L 15/32* (2013.01); *B60L 2200/26* (2013.01); *B60L 2210/30* (2013.01); *B60L 2210/40* (2013.01); *B60L 2220/14* (2013.01); *B60L 2220/42* (2013.01); *Y02T 10/648* (2013.01); *Y02T 10/7241* (2013.01)

(56) References Cited

U.S. PATENT DOCUMENTS

| | | |
|---|---|---|
| 6,431,297 B1 | 8/2002 | Nakazawa |
| 2008/0129231 A1 | 6/2008 | Toda et al. |
| 2013/0289911 A1* | 10/2013 | Patel ................... H02M 5/4585 702/65 |
| 2015/0191183 A1* | 7/2015 | Daum ................ B61L 15/0081 701/19 |
| 2016/0084181 A1* | 3/2016 | Henry ................ F02M 25/0719 123/568.21 |

FOREIGN PATENT DOCUMENTS

| | | |
|---|---|---|
| EP | 1029732 A2 | 8/2000 |
| EP | 0734900 B1 | 1/2001 |
| EP | 2189320 A1 | 5/2010 |
| JP | 2003174701 A | 6/2003 |
| JP | 2007252083 A | 9/2007 |

\* cited by examiner

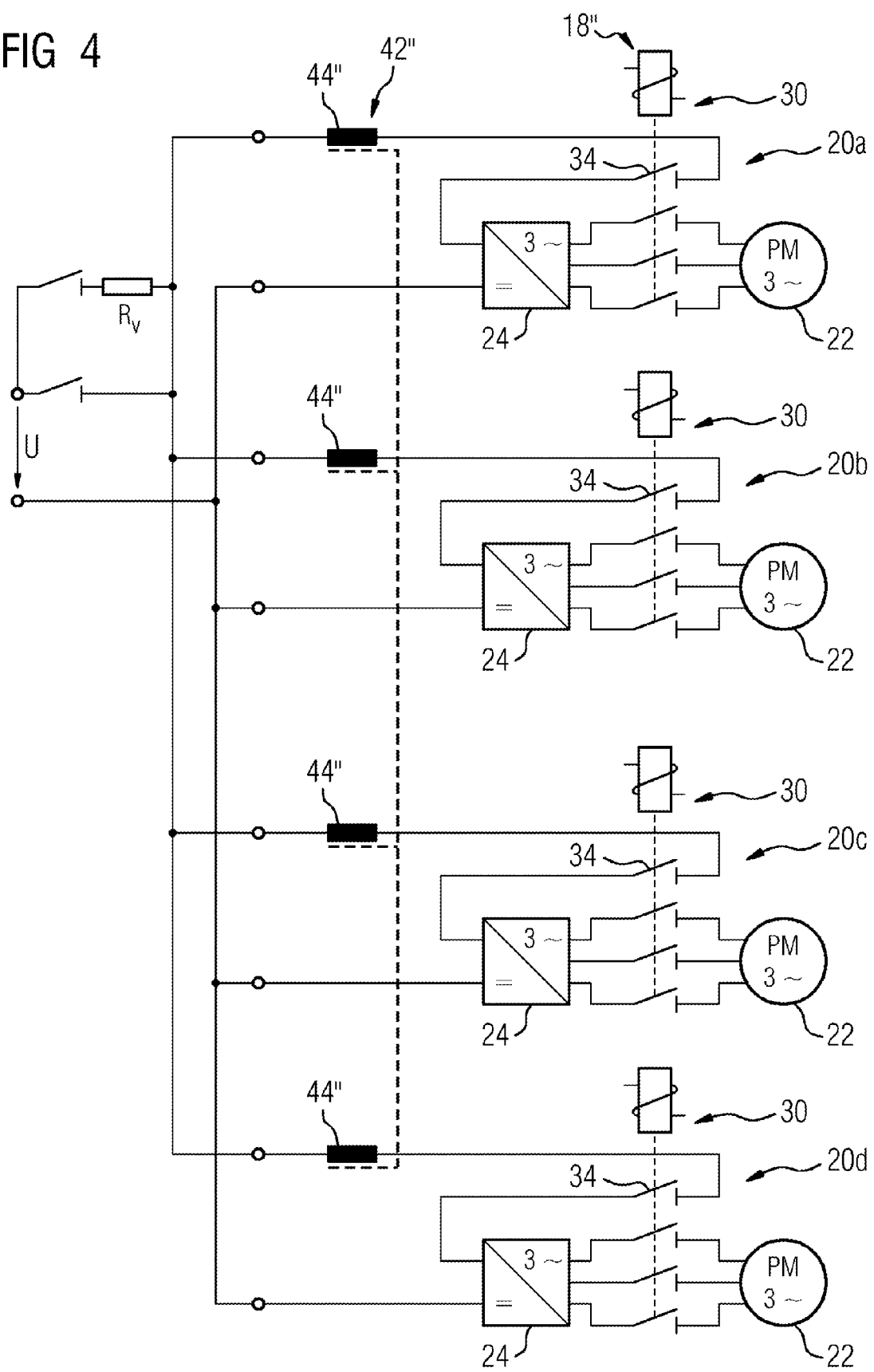

DRIVE DEVICE FOR A VEHICLE

BACKGROUND OF THE INVENTION

Field of the Invention

The invention relates to a drive device for a vehicle, in particular a rail vehicle, having a set of drive units which each have at least one electric traction motor and a power generation unit which is provided to generate power for the traction motor, and a set of motor contactor units which are each assigned to a traction motor.

In electric drive devices for vehicles, in particular for rail vehicles using conventional asynchronous motor technology, the traction motors and/or the pulse inverters which are necessary to feed the latter are partially connected electrically in parallel in order to make available the necessary drive power with the smallest possible amount of expenditure on components. However, if pulse inverters are connected in parallel with one another, wherein the parallel connection is supplied with electrical energy by a common feed, a defect which relates to a pulse inverter requires the entire parallel connection of pulse inverters to be switched off by means of a central mains contactor which is assigned to the parallel connection.

In order to be able to avoid the complete failure of traction, it has already been proposed to provide a plurality of electrically independent feeds, in particular independent intermediate connections, which can be switched on independently of one another. However, this requires additional mains contactors, pre-charging devices and assigned controllers, as a result of which the structural outlay and the costs become higher. This can be limited by supplying a plurality of traction motors from a common pulse inverter.

However, a parallel connection of traction motors to a pulse inverter is not possible in certain application cases such as, in particular, in the case of a traction equipment with synchronous motors. In these cases, a separate pulse inverter is provided for each traction motor, wherein each traction motor is respectively assigned a motor contactor unit which when necessary, such as for example when towing, disconnects the traction motor from the assigned pulse inverter. All the pulse inverters are connected in parallel with one another, wherein the parallel connection can be disconnected from the feed by means of a central mains contactor. The availability of the drive equipment with respect to a defect is accordingly particularly low.

BRIEF SUMMARY OF THE INVENTION

The invention is based on the object of making available a drive device of the generic type with which a high level of availability with respect to a defect can be achieved with low structural outlay and costs.

For this purpose it is proposed that at least one motor contactor unit has at least one switching means which is connected between the power generation unit for the assigned traction motor and a feed. As a result, the availability of the rail vehicle can be increased easily and cost-effectively by using a motor contactor unit which is present in a conventional way. This motor contactor unit, which conventionally comprises at least one switching element for disconnecting the assigned traction motor from the respective power generation unit and preferably a control unit for activating the switching element, can be easily retrofitted with an additional switching means which can be controlled by the control unit.

If the drive units each have a single traction motor, the dimensioning of the switching means is determined by the power load of the single assigned motor feed line, as a result of which commercially available and cost-effective switching equipment can be used for the switching means.

The term "between" relates, in particular, to a power flow for power which is drawn from the feed and fed to the assigned traction motor. With respect to the power flow, the switching means is arranged upstream of the power generation unit and the power flow can be interrupted by the switching means upstream of the power generation unit.

A "feed" is to be understood as meaning, in particular, a circuit whose function is to make available a specific electrical voltage.

This voltage is preferably a direct voltage, wherein the power generation units are each provided for generating an electrical signal for the assigned traction motor on the basis of the direct voltage which is made available, wherein the properties of the current correspond to a specific electrical power. In particular, the power generation units can be embodied as power converters, preferably as pulse inverters.

A plurality of independent feeds can be provided for the set of drive units, said feeds each being embodied as circuits, in particular intermediate circuits, which are independent of one another.

The proposed drive device is, however, suitable in particular for an embodiment thereof in which the drive units are connected in parallel with one another and the parallel connection of the drive units is supplied by the feed, since a higher level of availability can be achieved for this topology. The at least one motor contactor unit which is equipped with the at least one switching means can, in the event of a defect in the power generation unit for the traction motor assigned to the motor contactor unit, disconnect this power generation unit from the common feed by means of the switching means of said motor contactor unit, while the further power generation units can continue to be operated. If the parallel arrangement has n drive units, in the case of this defect a loss of at maximum $100/n$ % of the entire drive power which can be drawn via the feed can occur.

A particularly high level of availability can be achieved for arrangements having at least four drive units.

The traction motors are preferably embodied as synchronous motors. For the latter the condition applies that a plurality of traction motors cannot be fed by a single power generation unit. In this case there is therefore a need for a high number of power generation units which are preferably connected in parallel with one another and are supplied by a common feed.

In one preferred embodiment of the invention, the motor contactor unit has at least one switching element which serves to disconnect the assigned traction motor from the respective power generation unit, and a control unit which is provided for synchronously activating the switching element and the switching means. As a result, particularly simple connection of the switching means to the other, preferably conventional, components of the motor contactor unit can be achieved. When the switching means is opened in order to disconnect the traction motor from the respective power generation unit, this power generation unit can simultaneously be disconnected from the feed.

The availability can be increased further if all the motor contactor units each have at least one switching means which is connected between the power generation unit for the assigned traction motor and a feed. If the set of drive units is supplied by a common feed, the set of switching means in this embodiment can advantageously form a feed contactor unit which is designed to disconnect the set of drive units from the common feed by opening all the switching means. In this embodiment, each switching means is preferably assigned a different pre-charging circuit in each case.

Alternatively or additionally, the set of drive units can be supplied by a common feed, wherein a feed contactor unit is provided which serves to disconnect the set of drive units from the feed and has a central disconnection element which is connected between the set of drive units and the feed. As a result, a structurally simple connection of the drive device can be achieved.

In this context it is proposed that the drive device has a pre-charging circuit which is assigned to the feed contactor unit. A structurally simple embodiment with a central pre-charging circuit for the set of drive units can be obtained with a pre-charging circuit which is assigned to the central disconnection element.

In addition it is proposed that the drive device has an inductor unit with inductor elements which are each assigned to a different drive unit and are connected between the respective power generation unit and the feed, as a result of which a structurally simple arrangement for interaction between the power generation unit and the inductor element can be obtained.

A particularly low structural outlay can be achieved if all the motor contactor units each have at least one switching means which is connected between the power generation unit for the assigned traction motor and a feed, and the inductor elements are arranged between the feed and the respective switching means.

BRIEF DECSRIPTION OF THE SEVERAL VIEWS OF THE DRAWING

Figure 2:
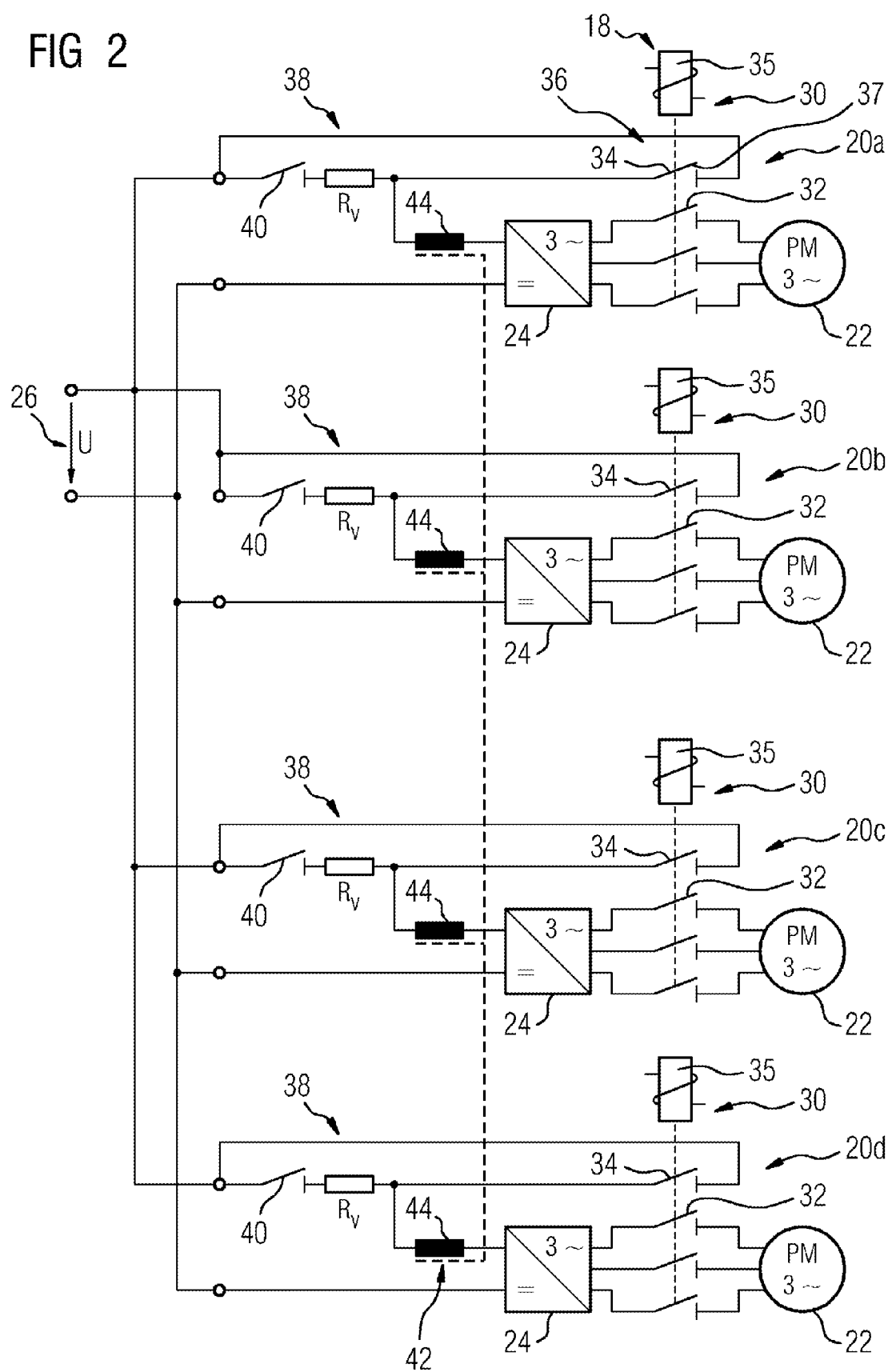
Figure 3:
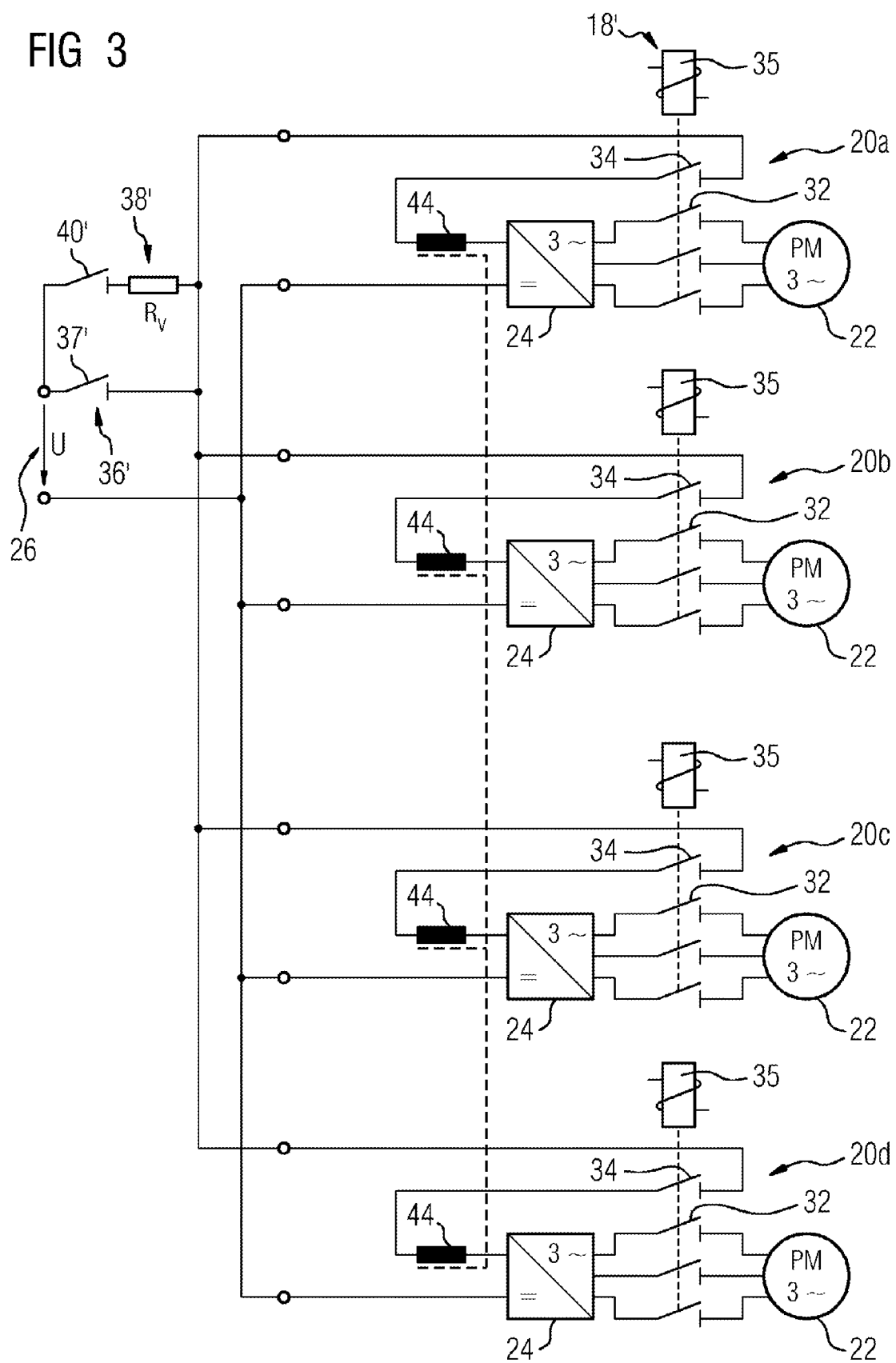

Exemplary embodiments of the invention will be explained below with reference to the drawings, in which:

FIG. 1: shows a rail vehicle having drive devices in a schematic side view,

FIG. 2: shows a drive device of the rail vehicle from FIG. 1 in a detailed view, FIG. 3: shows an embodiment variant of the drive device from FIG. 2, having a common feed contactor and a common pre-charging circuit, and FIG. 4: shows an embodiment variant of the drive device from FIG. 3, having an alternative embodiment of an inductor unit.

DESCRIPTION OF THE INVENTION

FIG. 1 shows a rail vehicle 10 which is embodied as a trainset, in a schematic side view. In an alternative embodiment, the rail vehicle can be embodied as a locomotive.

The rail vehicle 10 is formed by two head units 12.1, 12.3 and at least one center unit 12.2 arranged between the latter. The head units 12.1 and 12.3 each have two motor bogies 14, with two drive axles 16.A, 16.B each. They are also each equipped with a drive device 18 which serves to drive the drive axles 16.A, 16.B of the motor bogies 14.

The illustrated sequence of drive axles and idling axles is exemplary, wherein further axle sequences which appear appropriate to a person skilled in the art are conceivable.

The drive device 18 of a head unit 12 is illustrated in more detail in a detailed view in FIG. 2. Said drive device 18 has a set of four drive units 20.a to 20.d which each comprise an electric traction motor 22, which is embodied, in particular, as a synchronous motor, and a power generation unit 24. The traction motors 22 can each be mechanically coupled to a different drive axle. In the embodiment under consideration, the traction motors 22 can each be mechanically coupled to a drive axle 16.A or 16.B of the respective motor bogies 14.

The set of four drive units 20.a to 20.d draws electrical energy from a common feed 26, and are connected in parallel with one another. The feed 26 is electrically connected to a traction supply system 28, formed for example by an overhead line (FIG. 1), while the rail vehicle 10 is operating. Alternatively, the traction supply system 28 can be formed by a power rail in the region of the ground. Furthermore, it is also conceivable that, in an embodiment of the rail vehicle 10 with a diesel-electric drive, the feed 26 is electrically connected to a generator.

The feed 26 is formed, in particular, by a DC voltage intermediate circuit which makes available a DC voltage U for the generation of electrical power by the power generation units 24. When an alternating voltage is made available by the traction supply system 28, the feed 26 is connected to the traction supply system 28 at least via a rectifier and voltage control device (not shown), such as in particular a transformer. The intermediate connection of a rectifier is also expedient when the feed 26 is connected to a generator onboard the rail vehicle 10. If a direct voltage is made available by the traction supply system 28, the intermediate connection of a rectifier can be dispensed with.

The power generation units 24 each have switching elements (not illustrated in more detail) which generate, on the basis of the direct voltage U and according to a specific switching strategy, an electrical alternating current for feeding the assigned traction motor 22, wherein the properties of the current correspond to a desired electrical power. In order to control the power generation units 24, a drive control unit (not illustrated in more detail) of the drive device 18 is provided. In particular, the power generation units 24 are each embodied as pulse inverters.

The drive device 18 also has a set of motor contactor units 30 which are each assigned to a different traction motor 22 and which serve, when necessary, for example when there is a defect in the rail vehicle 10 or in the case of a shunting movement of the rail vehicle 10, to disconnect the traction motor 22 from the assigned power generation unit 24. For this purpose, each motor contactor unit 28 has switching elements 32 which are each provided for a different phase of the alternating current, in particular three-phase current, which is generated by the power generation unit 24.

The motor contactor units 30 also each have an additional switching means 34 which is connected between the assigned power generation unit 24 and the feed 26. The switching means 34 therefore serves, when necessary, to disconnect the power generation unit 24 from the feed 26. The switching elements 32 and the switching means 34 of a motor contactor unit 30 are activated by means of a control unit 35 of the motor contactor unit 30. In particular, the motor contactor units 30 are designed in such a way that a disconnection process with the switching elements 32 brings about a disconnection process, in particular a synchronous disconnection process, of the additional switching means 34.

Disconnection of the respective power generation unit 24 from the feed 26 can be carried out by means of the additional switching means 34. The switching means 34 of the motor contactor units 30 accordingly together form a feed contactor unit 36 which is designed to disconnect the set of drive units 20.a to 20.d from the feed 26. The complete set can be disconnected by virtue of the fact that all the switching means 34 are activated. The switching means 34 can be considered to be a disconnection element 37 of the feed contactor unit 36.

Each switching means 34 is assigned a pre-charging circuit 38 with a switching element 40 and a pre-charging resistor $R_v$, wherein the pre-charging circuit 38 is connected between the feed 26 and the respective power generation unit 24, and in parallel with the switching means 34.

The drive device 18 also comprises an inductor unit 42 with inductor elements 44 which are each assigned to a drive unit 20. The latter are each connected between the respective power generation unit 24 and the switching means 34 of an assigned motor contactor unit 30. The inductor elements 44 are formed, in particular, by a common iron core, which preferably corresponds to a transformer core. The inductor unit 42 is embodied, in particular, as a multi-winding inductor.

FIG. 3 shows the drive device 18' according to an alternative embodiment. In order to avoid unnecessary repetitions, the following description is limited to the differences between this embodiment variant and the embodiment according to FIG. 2.

The drive device 18' has a feed contactor unit 36' which serves to disconnect the set of drive units 20 from the feed 26. Compared to the above embodiment, the feed contactor unit 36' has a disconnection element 37' which is common to the set of drive units 20 and which is connected between this set or the parallel connection of drive units 20 and the feed 26. As a result, it is possible to dispense, in particular, with a pre-charging circuit 38 for each drive unit 20. Instead, the feed contactor unit 36' can be assigned one pre-charging circuit 38' for the entire set of drive units 20, which pre-charging circuit 38' is connected in parallel with the disconnection element 37'. The pre-charging circuit 38' has a switching element 40' and an electrical resistor $R_v$.

FIG. 4 shows the drive device 18" according to an alternative embodiment to the embodiment form FIG. 3. In order to avoid unnecessary repetitions, the following description is limited to the differences between this embodiment variant and the embodiment according to FIG. 3.

In this embodiment, an inductor unit 42" is provided whose inductor elements 44" are arranged upstream of the respective switching means 34 of the corresponding motor contactor unit 30 and therefore between the switching means 34 and the feed 26. In this context, the inductor unit 42" is embodied, in particular, as a multi-winding inductor with a common base point.

The invention claimed is:

1. A drive device for a vehicle or a rail vehicle, the drive device comprising:
 a feed;
 a set of drive units each having at least one respective electric traction motor and a power generation unit for generating power for said respective traction motor; and
 a set of motor contactor units each being associated with a respective one of said traction motors, at least one of said motor contactor units having at least one switching element configured to disconnect said associated traction motor from said respective power generation unit and at least one of said motor contactor units having at least one switching device connected between said respective power generation unit for said associated traction motor and said feed.

2. The drive device according to claim 1, wherein said drive units are connected with one another in a parallel connection and said parallel connection is supplied by said feed.

3. The drive device according to claim 1, wherein said traction motors are synchronous motors.

4. The drive device according to claim 1, wherein said motor contactor unit has a control unit for synchronously activating said switching element and said switching device.

5. The drive device according to claim 1, wherein each of said motor contactor units has at least one respective switching device connected between said respective power generation unit for said associated traction motor and said feed.

6. The drive device according to claim 1, wherein:
 said feed supplies said set of drive units in common; and
 a feed contactor unit is configured to disconnect said set of drive units from said feed and has a central disconnection element connected between said set of drive units and said feed.

7. The drive device according to claim 6, which further comprises a pre-charging circuit associated with said feed contactor unit.

8. The drive device according to claim 1, which further comprises an inductor unit having inductor elements each being associated with a different one of said drive units and being connected between said respective power generation unit and said feed.

9. The drive device according to claim 8, wherein said inductor elements are each disposed between said feed and a respective one of said switching devices.

10. A rail vehicle, comprising a drive device according to claim 1.

* * * * *